United States Patent
Oosawa (10) Patent No.: US 7,310,437 B2
(45) Date of Patent: Dec. 18, 2007

(54) IMAGE PROCESSING METHOD AND SYSTEM, AND STORAGE MEDIUM

(75) Inventor: Akira Oosawa, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 1050 days.

(21) Appl. No.: 09/800,773

(22) Filed: Mar. 8, 2001

(65) Prior Publication Data

US 2001/0021263 A1 Sep. 13, 2001

(30) Foreign Application Priority Data

Mar. 8, 2000 (JP) .............................. 2000-063600

(51) Int. Cl.
 *G06K 9/00* (2006.01)
(52) U.S. Cl. ...................... 382/132; 382/128
(58) Field of Classification Search ................ 382/132, 382/131, 130, 128, 254, 255, 275, 278, 294, 382/308, 257, 287, 236, 284; 128/922; 600/425; 356/39; 377/10
See application file for complete search history.

(56) References Cited

U.S. PATENT DOCUMENTS

| | | | | |
|---|---|---|---|---|
| 5,289,374 A * | 2/1994 | Doi et al. .................... | 600/407 |
| 5,359,513 A * | 10/1994 | Kano et al. ................. | 382/128 |
| 5,535,289 A * | 7/1996 | Ito .............................. | 382/130 |
| 5,790,690 A | 8/1998 | Doi et al. .................... | 382/128 |
| 5,832,134 A * | 11/1998 | Avinash et al. ............. | 382/257 |
| 5,917,962 A * | 6/1999 | Chen et al. .................. | 382/291 |
| 5,937,111 A * | 8/1999 | Yamada ....................... | 382/308 |
| 5,987,345 A * | 11/1999 | Engelmann et al. ......... | 600/407 |
| 6,011,862 A | 1/2000 | Doi et al. .................... | 382/132 |
| 6,014,474 A | 1/2000 | Takeo et al. ................. | 382/308 |
| 6,067,373 A * | 5/2000 | Ishida et al. ................. | 382/130 |
| 6,075,877 A * | 6/2000 | Takeo .......................... | 382/130 |
| 6,112,112 A * | 8/2000 | Gilhuijs et al. ............. | 600/425 |
| 6,169,823 B1 * | 1/2001 | Takeo et al. ................. | 382/308 |
| 6,574,374 B1 * | 6/2003 | Acharya ...................... | 382/257 |
| 6,594,378 B1 * | 7/2003 | Li et al. ....................... | 382/128 |
| 2001/0007593 A1 * | 7/2001 | Oosawa ....................... | 382/132 |
| 2001/0033702 A1 * | 10/2001 | Kawabata .................... | 382/294 |
| 2002/0048020 A1 * | 4/2002 | Yoshitake et al. ........... | 356/399 |
| 2002/0090126 A1 * | 7/2002 | Oosawa ....................... | 382/132 |
| 2002/0097901 A1 * | 7/2002 | Xu et al. ..................... | 382/131 |

FOREIGN PATENT DOCUMENTS

| JP | 7/37074 | 2/1995 |
|---|---|---|
| JP | 8/272961 | 10/1996 |
| JP | 8/335271 | 12/1996 |
| JP | 9-91421 | 4/1997 |
| JP | 9-248291 | 9/1997 |
| JP | 11-342900 | 12/1999 |

OTHER PUBLICATIONS

Jatko ("Nonlinear filter derived from topological image features" SPIE, vol. 1295 Real-Time Image Processing II, Published in 1990, pp. 8-16).*
Morphology; Corona; Hidefumi Kobatake; Nov. 15, 1996.

* cited by examiner

*Primary Examiner*—Duy M. Dang
(74) *Attorney, Agent, or Firm*—Sughrue Mion, Pllc.

(57) ABSTRACT

An image processing method and system in which the artifacts occurring in an interimage-difference image obtained based on two or more diagnostic images taken of the same subject are reduced. An image processing procedure is performed by which the artifacts occurring in an energy subtraction image are controlled relative to the substantial difference between the two images based upon which the energy subtraction image has been obtained.

19 Claims, 9 Drawing Sheets

IMAGE PROCESSING METHOD AND SYSTEM, AND STORAGE MEDIUM

BACKGROUND OF THE INVENTION

1. Field of the Invention

The present invention relates to an image processing method and system in which representation of the difference between two or more images taken of the same subject is improved.

2. Description of the Related Art

It is a common practice in a wide variety of fields to read and compare a plurality of two or more images taken of the same subject in order to discern the difference between images, and carry out an inspection of the subject based on the thus discerned difference, etc.

In the industrial products manufacturing industry, for example, images taken of a product when it is new and images taken of the same product after it has been subjected to an endurance test are compared, and attention is focused on the area showing the biggest difference so that an examination as to whether or not there are areas requiring improvement in product endurance can be carried out. In the medical field, doctors read and compare a plurality of radiation images of the diseased part of a patient taken in a time series manner in order to ascertain the course of the disease and determine the proper treatment.

In this fashion, reading and comparison of a plurality of images is carried out daily in a wide variety of fields, with the images to be read and compared being output to a display means such as a monitor, to film, or another recording medium. In other words, the image is converted to luminescence and density signals and displayed on a monitor, etc., or output to film or another hard-copy recording medium by a printer or the like.

Generally, although the area of the most interest to the viewer of such images is the area wherein the greatest difference is shown, when the images to be read and compared are output, they are simply lined up and output. However, under such conditions, the smaller the difference between the images is, the more difficult it becomes to discern.

Therefore, image processing methods that facilitate discernment of the difference between images with a higher degree of accuracy and reliability are desired. These generally start with a subtraction process that calculates the difference between corresponding structural positions (anatomically characteristic positions) of the two images, followed by extraction and enhancement of the aforementioned difference (Japanese Patent Application No. 11(1999)-342900). In this way, only the difference between images is extracted and enhanced, thereby enabling the viewer to ascertain the difference with certainty, and this is considered to contribute greatly to the prevention of misdiagnosis due to oversight of a diseased part requiring treatment or the course of progression of a disease.

In addition, when computation of the interimage-difference is to be performed, it is necessary to first align the corresponding positions of structural bodies appearing in each image (structural positions). Such alignment might entail as a first alignment, for instance, a global transformation (affine transformation, etc.) of parallel displacement, rotating and enlarging or reducing the images, and the image obtained thereby is then subjected to a second alignment entailing the division of the aligned image into a plurality of local-regions, and then matching each corresponding local-region, based upon which a non-linear distortion translation (warping) dependent on curve-fitting (two-dimensional, 10th order polynomial function) is performed. The utilization and combination of such techniques, etc. are known as shown in Japanese Unexamined Patent Publication No. 7(1995)-37074, etc.

However, after aforementioned alignment has been performed, small misregistrations occur between the outlines of structural positions that have not been perfectly aligned (position-misregistration), and artifacts appear in an inter-image-difference image where position-misregistrations occur at such outlines. Up until now, if no artifacts appeared in an interimage-difference image, because only the substantial difference between two images, representing the change due to the progress of the course of a disease, etc. of a diseased part, showed up, the size of a diseased part, the course of a disease, etc. could be effectively judged. If artifacts appeared in the image however, they obscured and thereby prevented the substantial difference from being discerned with accuracy, creating the possibility that the difference might be overlooked.

Particularly for cases in which the images are radiation images, because the three-dimensional (3-D) misalignments, occurring due to the slight changes in the direction from which the radiation is emitted, the axis of the body and its angle, the angle at which the radiation enters the subject, etc., represented in a two-dimensional (2-D) image are exceedingly difficult to correct by use of alignment techniques, the appearance of artifacts is to some extent unavoidable.

However, it is necessary to eliminate the potential that the substantial difference be overlooked due to the appearance of artifacts.

SUMMARY OF THE INVENTION

The present invention has been developed in consideration of the in the prior art problems described above.

Accordingly, the first objective of the present invention is to provide an image processing method and system that reduces, more than in the prior art, the occurrence of artifacts, relative to the substantial difference between two images, due to misalignment of structural positions within the images.

The image processing method and system of the present invention improve examination-reading efficiency of the substantial difference between two images, which is the area of interest to a viewer of the images, by enhancement of said substantial difference relative to said artifacts, and thereby further reducing the occurrence of artifacts due to misalignment of structural positions, which adversely affect inspection-reading of the difference between images.

That is to say, the image processing method of the present invention, in which two desired images from among a plurality of images taken of the same subject are subjected to an interimage-difference computation process to obtain an interimage-difference image representing the difference between the two images, is characterized in that the substantial difference between the aforementioned two images represented in the interimage-difference image is enhanced relative to the artifacts appearing in the interimage-difference image due to misalignment of corresponding structural positions of aforementioned two images.

As aforementioned two images, the present invention is applicable to radiation images taken of the same subject at different points in time in a time sequence manner. Application of the present invention is particularly effective for images taken of a live body. Because the internal structures of a living body move in three dimensions, the relationship of corresponding structural positions between the two images easily become displaced between images, due to the ease with which position-misregistrations (misalignments) occur.

Note that the referent of the expression "two desired images from among two or more images taken of the same subject" is not limited to images taken of the same part of the same subject at different points in time in a time series manner, but also can include each portion representing each portion of images taken on the same day containing positions of substantially the same form (for example, left and right lungs, left and right breasts, etc). That is to say, the referent of "two images", or "two or more images" is not limited to being two different images, but can refer also to different sections of the same image.

Employment of a subtraction process between the corresponding structural positions of two images is advantageous in the present invention, because it is easy to improve the clarity of the difference between the two images obtained thereof by expressing the difference as an image signal. Note that, the present invention is not limited however, to being able to employ only a subtraction process as image processing; the application of processes such as a division process, etc. cannot be discarded. The subtraction process can comprise simple subtraction, or a weighted subtraction. The image obtained by a subtraction process is generally called a subtraction image. Subtraction images include energy subtraction images, which are obtained by performing simple subtraction between two original energy images differing in energy distribution profiles (original images: a high energy image <a normal radiation image>, a low-energy image <a high-energy control image>) obtained at substantially the same in a time in a time sequence manner; time-elapse subtraction images, which are obtained based on two original images taken at different points in time in a time series manner; DSAs (Digital Subtraction Angiographs), which are obtained based on two original images of a vein taken before and after a contrast medium has been injected into a vein, etc.

Relative-enhancement processing of the artifacts appearing in the substantial difference between two images represented in the interimage-difference image can entail enhancement of the artifacts, or conversely, the control of such artifacts.

Application of a processing method based on a morphology process, which utilizes structural elements smaller than the substantial difference and larger than the artifacts, to control artifacts relative to the substantial difference is advantageous. This is because is such artifacts can be effectively controlled without adversely effecting the image clarity of the substantial difference between two images. Generally, morphology is developed as a set theory for an N-dimensional space, however, there are many examples of its application to two-dimensional images (refer to Japanese Unexamined Patent Publication Nos. 8(1996)-272961, 9(1997)-248291, 9(1997)-91421). Hereinafter follows a simple explanation of the morphology process, using a contrast-image as an example.

A one-dimensional function f (x) is to be applied to a section of a contrast image regarded as a space having an adequate height at a point with the coordinates (x, y) having a contrast value f. As shown in formula (1), the morphology process utilizes structural element g in a symmetrical function symmetrical to the original point.

[Formula 1]

$$g^s(X) = g(-X) \qquad (1)$$

The value for the defined area is 0, and the defined area g is as shown in equation (2).

[Formula 2]

$$G = \{-m, -m+1, \ldots, -1, 0, 1, \ldots, m-1, m\} \qquad (2)$$

At this juncture, the base shape of the morphology-computation is extraordinarily simple, as shown in formulae (3)-(6)

[Formula 3]

$$\text{dilation}; [f \oplus G^s](i) = \max\{f(i-m), \ldots, f(i), \ldots, f(i+m)\} \qquad (3)$$

$$\text{erosion}; [f \ominus G^s](i) = \min\{f(i-m), \ldots, f(i), \ldots, f(i+m)\} \qquad (4)$$

$$\text{opening}; f_g = (f \ominus g^s) \oplus g \qquad (5)$$

$$\text{closing}; f^g = (f \oplus g^s) \ominus g \qquad (6)$$

Figure 9A:
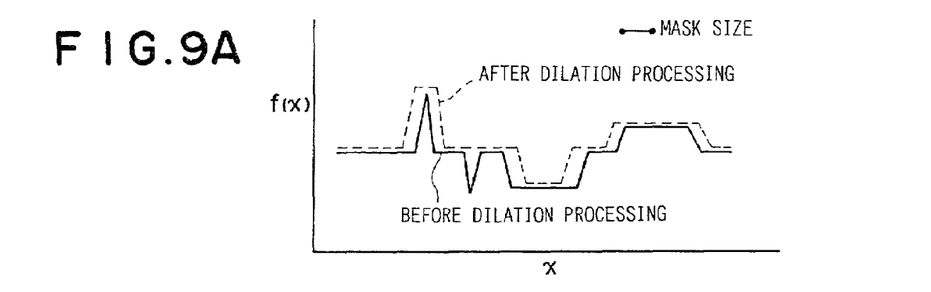
FIG. 9A to 9D are figures provided for explanation of morphology.

That is to say, the dilation process comprises finding the largest value within the range of the width±m (the value determined in accordance to structural element B, corresponding to the mask size shown in FIGS. 9A to 9D), for the pixels of interest at the center thereof (refer to FIG. 9A). On the other hand, the erosion process comprises finding the smallest value within the range of the width ±m for the pixels of interest at the center thereof (refer to 9B). Additionally, the opening-process comprises performance of the erosion process followed by performance of the dilation process, in other words, the process of first finding the smallest value, and then finding the largest value; and the closing-process comprises performance of the dilation process followed by performance of the erosion process, in other words, the process of first finding the largest value, and then finding the smallest value.

Figure 9B:
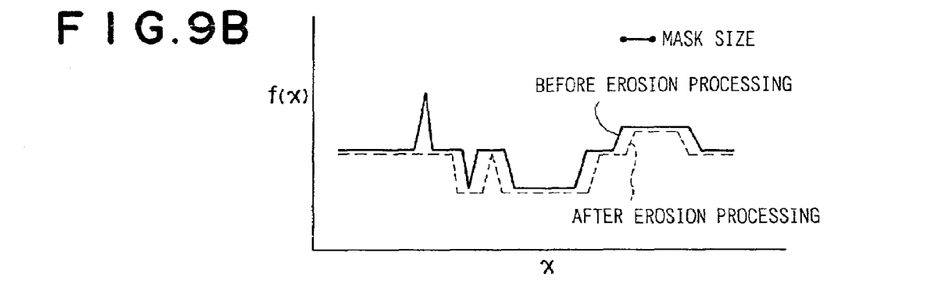
Figure 9C:
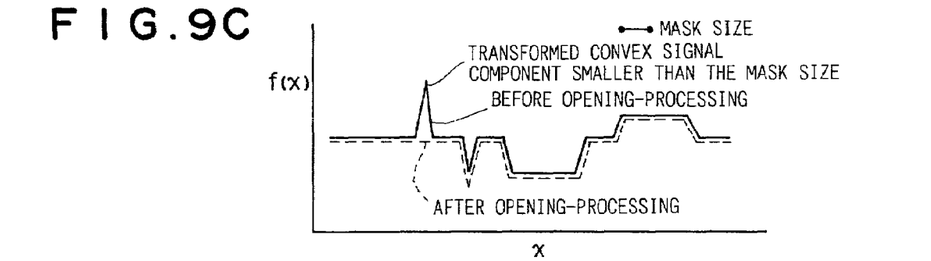
Figure 9D:
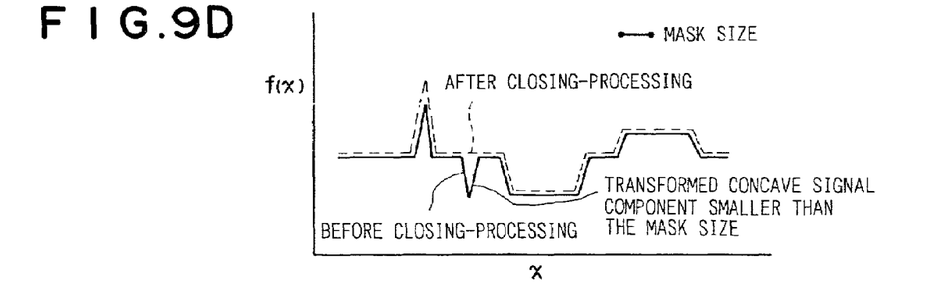

In other words, the opening-process corresponds to smoothing density curve f (x) from the low-density side so as to control the convex-shaped contrast-shift areas (portion having a higher density than that of the areas surrounding it) to a spatial range narrower than that of mask 2m (refer to FIG. 9C) On the other hand, the closing-process corresponds to smoothing density curve f (x) from the high-density side so as to contain the concave-shaped contrast-shift areas (portion having a lower density than that of the areas surrounding it) to a spatial range narrower than that of mask 2m (refer to FIG. 9D).

Here, compared to cases in which there is a signal having a high luminescence signal level, the relationship is reversed for cases in which there is a signal having a high density signal level in correlation to the increase in density level thereof: the dilation processing of a signal having a high density signal level is equivalent to the erosion processing of a signal having a high luminescence signal level (refer to FIG. 9B); the erosion processing of a signal having a high density signal level is equivalent to the dilation processing of a signal having a high luminescence signal level (refer to FIG. 9A); the opening-processing of a signal having a high density signal level is equivalent to the closing-processing of a signal having a high luminescence signal level (refer to FIG. 9D); and the closing-processing of a signal having a high density signal level is equivalent to the opening-processing of a signal having a high luminescence signal level (refer to FIG. 9B).

Therefore, by subjecting an image signal representing an original image to opening or closing morphology ("Morphology", authored by Kobatake, published by Corona, etc.), granularity (meaning the noise in an image) can be controlled (or eliminated). Note that although for the sake of simplicity an explanation has been proffered using a one-dimensional mask (structural element) for a one-dimensional density distribution as an example, for cases in which an image expands two-dimensionally, multiple one-dimensional structural elements can be set therein, and multiple iterations of the processing can be performed, once for each structural element, or a two dimensional-structural element can be set and processing can be concluded after one iteration of the processing on the two-dimensional structural element.

The apparatus according to the present invention for performing the image processing method of the present invention is provided with an image processing means for processing an interimage-difference image obtained by subjecting two desired images from among two or more images obtained of the same subject to interimage-processing; wherein, aforementioned image processing means subjects aforementioned interimage-difference image to processing so as to emphasize the substantial difference between the two images relative to the artifacts occurring due to misalignment of structural elements with the two images.

Note that as described above, aforementioned "two desired images from among two or more images taken of the same subject" can refer, for example, to two radiation images taken of the same part of the same subject at different points in time in a time series manner, but is not limited to this.

Application of the present invention to two or more X-ray images of the same subject take at different points in time for the purpose of comparison is effective and advantageous.

It is preferable that subtraction processing be applied between corresponding structural positions of two images as the interimage processing.

As an image processing means, it can be used to carry out image processing so as to control the artifacts relative to the substantial difference between two images, or conversely, to emphasize the substantial difference between to images relative to the artifacts occurring thereof. For cases in which the image processing means performs processing to control the artifacts, it is desirable that such processing be performed based on the application of morphology employing structural elements that are larger than the artifacts and smaller than the substantial difference.

Note that there is nothing in the image processing method and apparatus described above that interferes application thereof to subject matter other than the human body, such as plants and animals, industrial products, geological formations, heavenly bodies, landscapes, etc.

According to the image processing method and apparatus of the present invention, by subjecting an interimage-difference image to processing so as to enhance the substantial difference between to images relative to the artifacts, which adversely effect image examinability, the artifacts can be reduced relative to the substantial difference between the images, which is the portion of interest between the images, and the difference between the images is thereby rendered more easy to examine than in the prior art, and image examining efficiency is improved.

DESCRIPTION OF THE PREFERRED EMBODIMENTS

Hereinafter, a preferred embodiment of the image processing method and apparatus according to the present invention will be explained with reference to the drawings.

Figure 1:
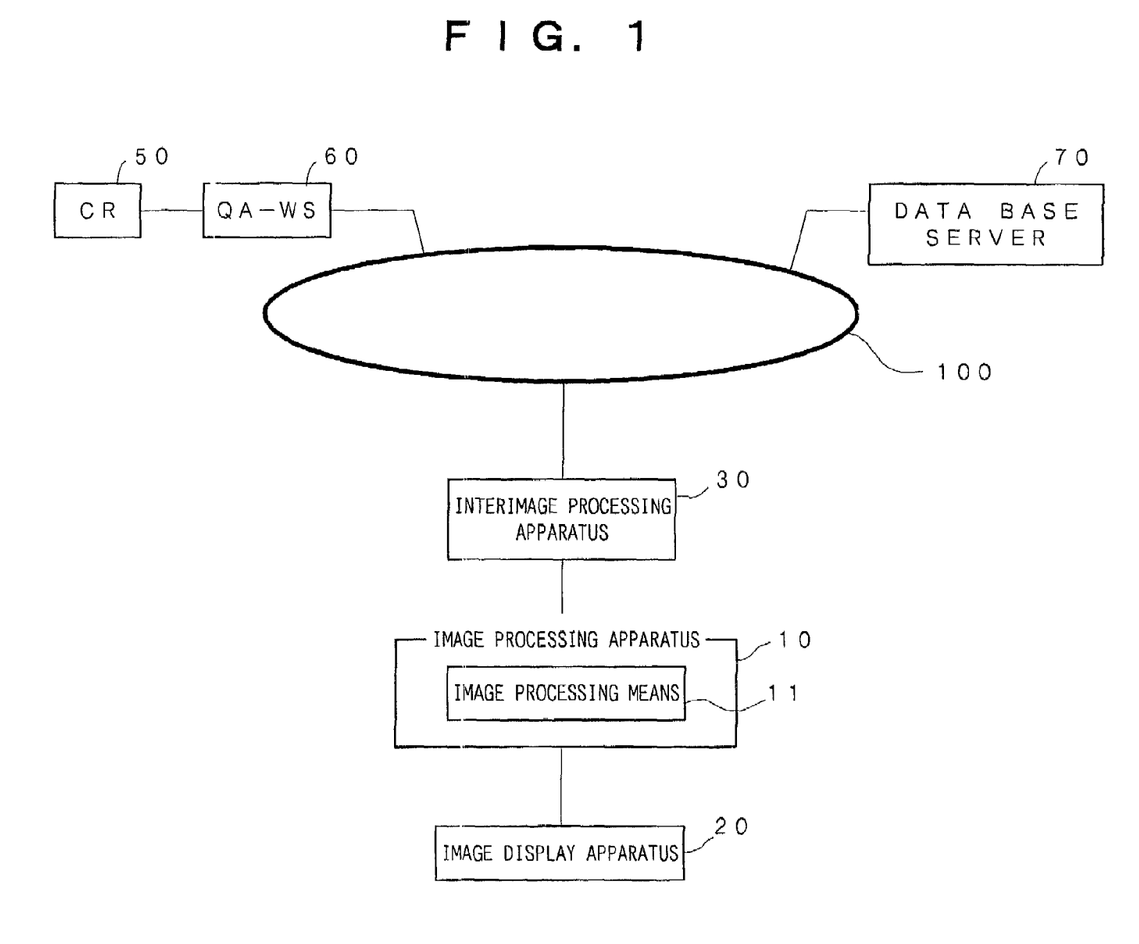
FIG. 1 shows the configuration medical network implementing an embodiment of the image processing apparatus of the present invention.
Figure 2A:
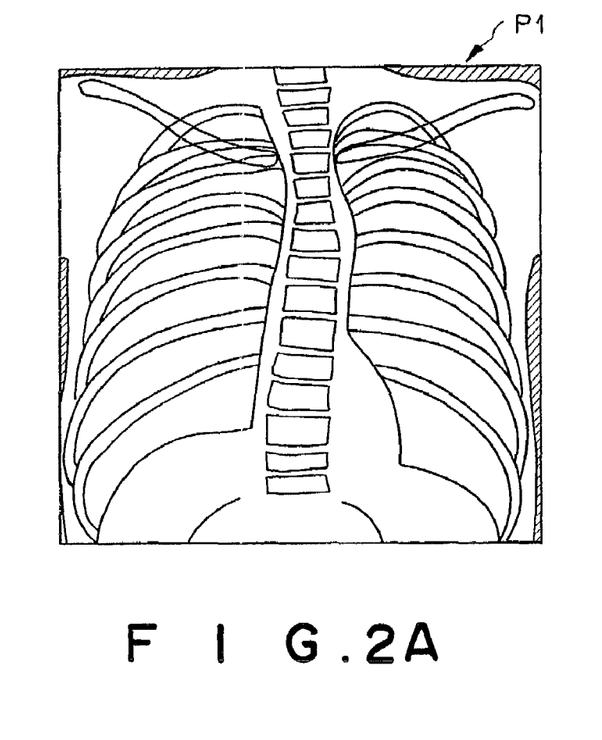
FIGS. 2A and 2B show two original images that are to be subjected to temporal subtraction processing by the interimage processing apparatus.
Figure 2B:
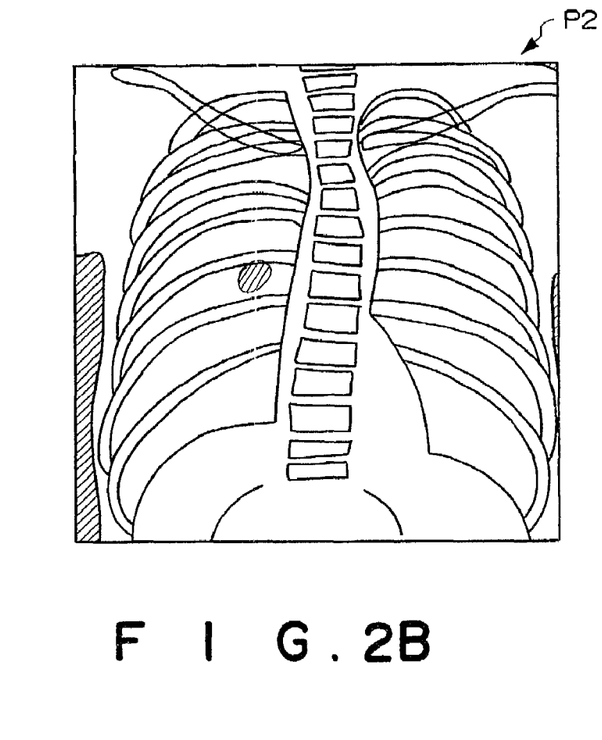

FIG. 1 shows a medical network 100 implementing an embodiment of the image processing method and apparatus 10 according to the present invention.

Connected to network 100 shown in the drawing are: a CR (Computed Radiography) 50 or other such medical image formation apparatus such as a CT (Computed Tomography) apparatus, MRI (Magnetic Resonance) apparatus, etc.; a cumulative data base 70 for storing each type of diagnostic image created by aforementioned medical image formation apparatuses; a display apparatus 20 for displaying images stored in database 70 and images transmitted directly from the image formation apparatuses; an interimage processing apparatus 30 that obtains a temporal subtraction image (one type of interimage processing image), based on two or more image data input thereto, by performing a temporal subtraction process, which is one example of interimage processing; and an image processing apparatus 10 for subjecting the subtraction image formed by interimage processing apparatus 30 to the image processing described below. Note that also connected to network 100 are various types of image output devices such as printers, etc. for outputting images circulated within the network to film, etc. that are not shown in the drawings.

An image of a subject through which radiation is obtained by CR apparatus 50, which is provided with a sheet that has a stimulable phosphor layer that absorbs some of the radiation energy passed through the subject and records an image thereof thereon. Afterwards, by photoelectrically reading the radiation energy stored on the stimulable phosphor sheet, which is emitted as a stimulated emission when said stimulable phosphor sheet is irradiated with a laser beam, the CR apparatus 50 obtains the radiation image of the subject as digital image data; such systems are in wide use in medical facilities.

QA-WS workstation 60 (for checking image quality), which is connected along the network between CR apparatus 50 and network 100, checks images formed by aforementioned CR apparatus 50 and other medical image formation apparatuses, and is provided with a function for issuing a request to the medical image forming apparatus (CR apparatus 50, etc>), to re-take an image, etc. In this embodiment, before storing digital image P created by CR apparatus 50 into database 70, QA-WS60 is provided so as to perform an image quality check of the image density, contrast, etc. and also a check of the photographed range of the image, etc.

Display apparatus 20 is not merely for displaying as a visual image the images input thereto from database 70, it is also equipped with functions to provide for use thereof as a terminal for inputting requests to perform subtraction processing, etc. between two or more images P taken of the same part of the same subject.

As described above, interimage processing apparatus 30 obtains a temporal subtraction image, based on two or more chest radiation images P1 and P2 taken of the same subject at different points in time in a time series manner and input from database 70 via network 100, that represents the substantial difference between the two images, and also aligns the structural positions appearing within images P1 and P2 (ribs, the chest, lungs, the heart and other organs, etc.): first, a global matching is performed; after that, a second matching process in which the images are divided up into a plurality of local regions, each of which is then registered with its respective counterpart; and based on the two images obtained thereby, corresponding pixels between the two images are subtracted. Note that each matching process will be explained in detail below.

The image processing performed by image processing apparatus 10 on the temporal subtraction image Psu obtained by interimage image processing apparatus 30 comprises the enhancement of the substantial difference between images P1 and P2 represented by subtraction image Psu, which has been obtained by application of image position matching processes, relative to artifacts L appearing therein due to misalignment between structural positions within images P1 and P2. That is to say, relative control of artifacts L is not performed wherever they are caused by position gaps between structural positions within images P1 and P2, but with respect to the tumor or diseased portion (hereinafter referred to simply as the diseased portion) appearing in only one of either image P1 or P2, or to the diseased portion K contained in both images P1 and P2, etc., which have different densities or outlines in images P1 and P2, being examined to determine the effect of treatment and the change over time in the course of the disease.

More specifically, with respect the frequent cases in which artifacts L, characterized in that they are long and thin forms, appear along the outlines of structural bodies, although there is change in the diseased portion K that is the substantial difference between images according to the course of the disease after the initial appearance thereof, the form thereof expands in a substantially circular or substantially rectangular form of a wider region than the long and narrow form of artifacts L, and can be recognized. Accordingly, by application to such a subtraction image Psu of morphology processing utilizing structural elements larger than the width (at a substantially perpendicular cross-section with respect to the lengthwise direction thereof) of the long and thin artifacts L and smaller than diseased portion K (for example, circular structural elements having such a diameter, rectangular structural elements having a side of such a length, etc.) as said image processing, diseased part K, which is larger in size than the structural elements, remains and long and thin artifacts L, which are smaller in size than the structural elements, can be eliminated.

Note that for cases in which morphology processing is applied to subtraction image Psu, which is a high and low density image, Psu is divided into a high-density image (the whole image obtained by replacing the portion having a density lower than the base density with the base density) Psu1 composed of the base density (the portion in which the difference in density between P1 and P2 is 0) of Psu and the densities higher than the basic density, and a low density image (the whole image obtained by replacing the portion having a density higher than the base density with the base density) Psu2 composed of the base density and the densities lower than the base density. High-density image Psu1 and low-density image Psu2 are then subjected to aforementioned morphology processing, and because it is preferable that the two images obtained thereby be subjected to an addition processing (at a weighted ratio of 0.5×0.5), the processing will be explained as such.

Next, the operation of the image processing apparatus will be explained.

Chest radiation transparency images P1, P2, ..., Pn are taken of a specific patient at different points in time in advance by CR apparatus 50, and after an image quality control check is conducted by QA-WS60 on P1, P2, ..., Pn, they are stored in database 70.

First, an explanation of an example case in which, a request that a subtraction image Psu be obtained based on the image taken at the most remote point in time (the first image,), P1, and an image taken at a point in time less remote (the second image,), P2 has been specified from display terminal 20, which serves as the specification input terminal.

The request input at display terminal 20 is input to database 70 via network 100, and the first image, P1 and the second image, P2 are input via network 100 to interimage processing apparatus 30.

Figure 3:
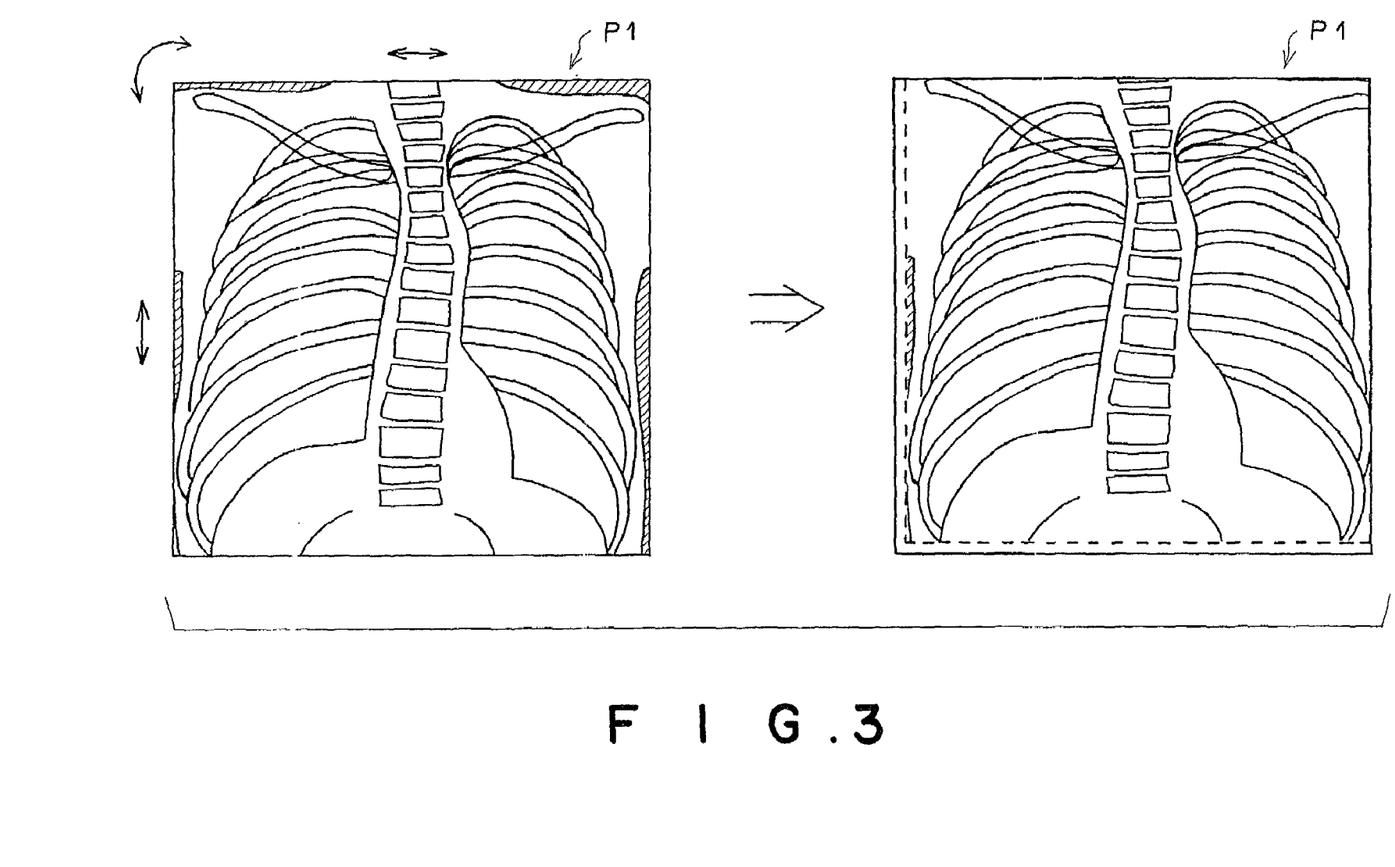
FIG. 3 is a figure provided for explanation of global matching.
Figure 4:
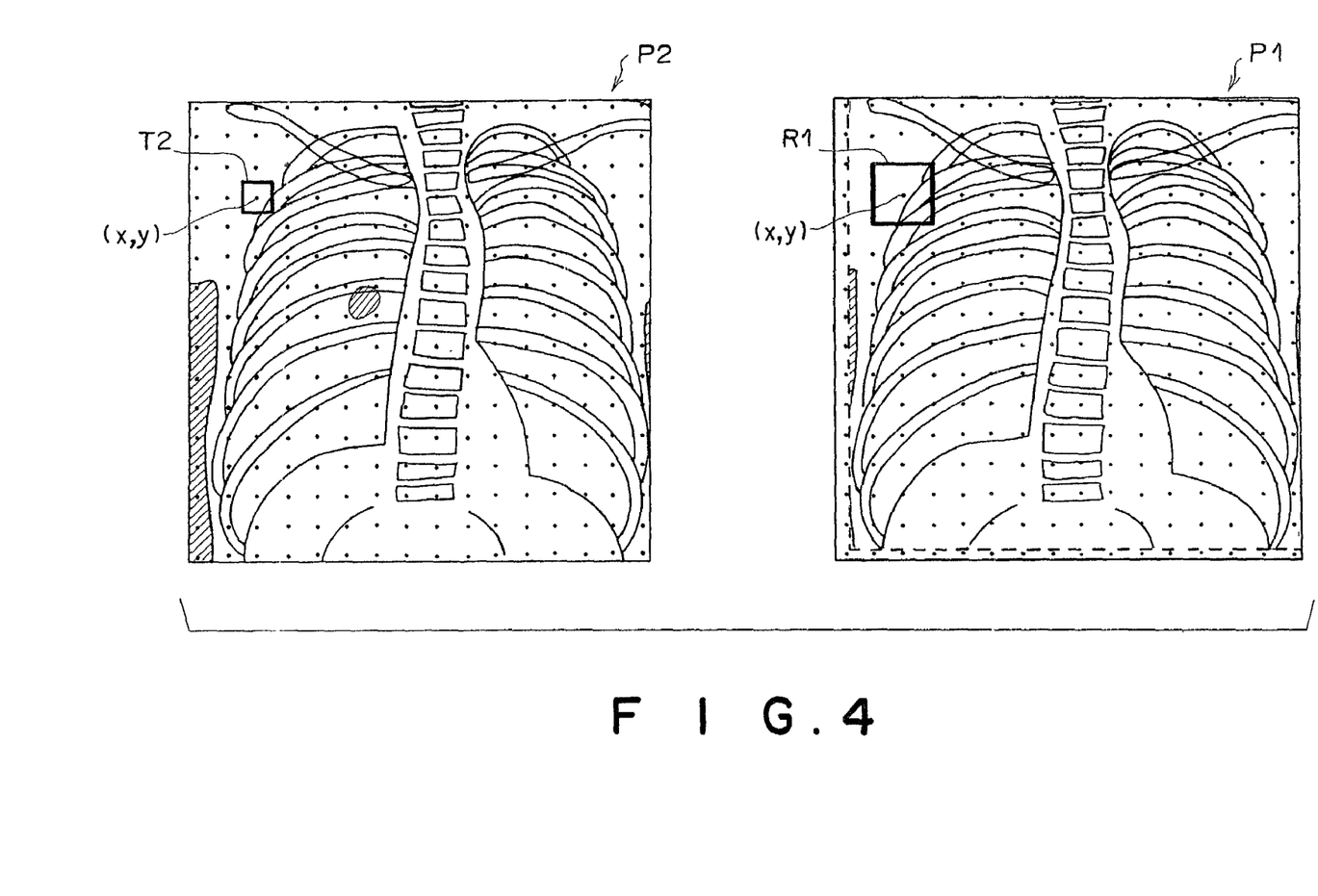
FIG. 4 is a figure provided for explanation of local matching.

Interimage processing apparatus 30 first subjects images P1 and P2 to global matching, in which the structural positions between said two images are matched, and then divides each image obtained thereby into a plurality of local regions and matches the positions of each local region to its respective counterpart. That is to say, of the two images shown in FIG. 2 taken in a time series manner, the newer image (the second image,) thereof is taken as the base image, and the first image, P1, is subjected to affine transformation and globally matched to the second image, P2 (refer to FIG. 3). Continuing, the second image, P2, of globally matched images P1 and P2 is subjected to processing wherein it is divided into a plurality of hypothetical small rectangular template regions T2 by use of a template, the the first image, P1 is registered to each template T2 region of the second image, P2. A search region R1, which is larger than template region T2, is set for each template region T2, and in each search region R1, the corresponding template region substantially matched to each template region T2 of the second image, P2, is obtained (refer to FIG. 4). Based on the shift amount between positions of each template region T2 of the second image, P2, and each corresponding template region of the first image, P1, global matching is performed so that each corresponding region of the first image, P1 is substantially matched to each template region T2 of the second image, P2, and then the first image, P1, in its entirety s subjected to non-linear warping (refer to FIG. 5) and images P1 and P2 are again matched.

Further, interimage processing apparatus 30 coordinates the pixels of the first image, P1, which has been subjected to the two position matching transformation steps described above, and the second image, P2, which has served as the base image, and subjects the first image, P1, and the second image, P2, to subtraction processing in accordance with formula 7 described below, whereby subtraction image Psu of images P1 and P2 is obtained.

(Formula 7)

$$Psu = (P1 - P2) \times cont + mid$$

Cont: contrast coefficient
mid: mean value (for cases in which processing is 10 bit, 512)

Normally, because the portions of images P1 and P2 in which there is no difference in density are displayed as the mean value, subtraction image Ssu is formed based on formula 7. In addition, because diseased part K contained in the second image, P2 is displayed as a high-density (dark) portion, P2 is subtracted from P1. That is to say, due to the frequency of occurrence of cases in which diseased part K appears as a low-density shadow in the second image, P2, although diseased part K is appears as a low density portion in subtraction image Psu' obtained by subtracting P1 from P2, because diseased part K is normally displayed as a high-density portion on the display apparatus, subtraction image Psu is usually converted and then output. Because said conversion processing in the display apparatus is omitted in the current embodiment, subtraction is carried out based on aforementioned formula 7.

Note that there are cases for which the order in which images P1 and P2 are subtracted is reversed. For example, depending on the type of disease and the nature of the change thereof, there are instances in which diseased part K appears as a high-density shadow in the second image, P2. Further, even for cases in which the diseased portion appears as a high-density shadow, because of a reversal in the diseased part due to treatment thereof, there are cases in which the absence of the diseased part is observed. Therefore, the order in which subtraction between images P1 and P2 is performed can be set according to the type of disease and the objective of the examination.

Here, when the position matching described above is complete, as shown in FIG. 6, subtraction image Psu, which is the difference between the first image, P1, and the second image, P2, represents the diseased portion K that is the substantial difference between images P1 and P2 that is actually only present in the second image, P2, and is not present in the first image, P1. However, in actuality, complete matching is very difficult to obtain, and not only diseased portion K, but artifacts L (refer to FIG. 7) caused by misalignment of the outlines of ribs and other structural bodies within the images also remain in subtraction image Psu, and examination reading performance suffers thereby.

Figure 8A:
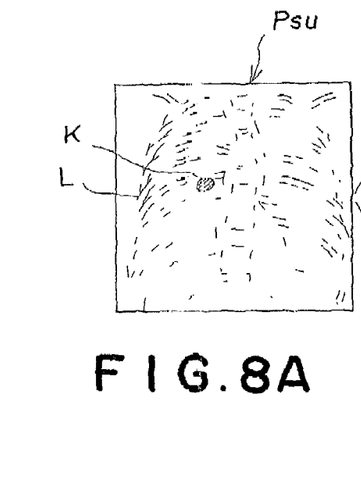
FIG. 8A to 8D are figures provided for explanation of the temporal image processing performed in the current embodiment.
Figure 8B:
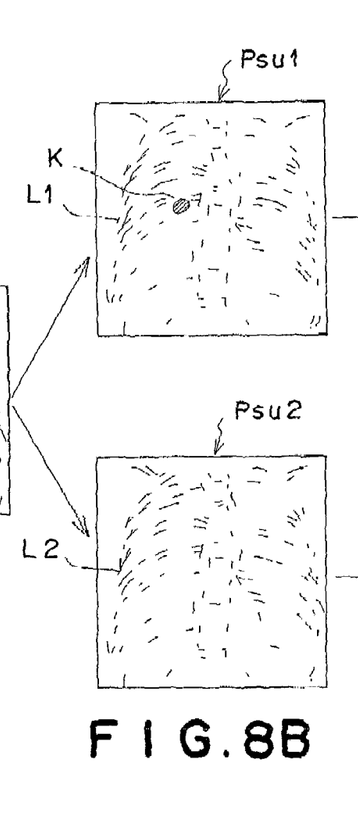

Here, in the current embodiment, image processing apparatus 10 controls artifacts L remaining in subtraction image Psu relative to diseased portion K. More specifically, subtraction image Psu (FIG. 8A) is divided into a high-density image (the whole image obtained by replacing the portion having a density lower than the base density with the base density) Psu1 composed of the base density (the portion in which the difference in density between P1 and P2 is 0) of Psu and the densities higher than the basic density, and a low density image (the whole image obtained by replacing the portion having a density higher than the base density with the base density) Psu2 composed of the base density and the densities lower than the base density (FIG. 8B). Continuing, on the one hand, high-density image Psu1 is subjected tomorphology processing (opening processing) utilizing structural components (round) whose size has been set in advance (FIG. 8C), and on the other hand, low-density image Psu2 is subjected to morphology processing (closing processing) utilizing structural components (round) whose size has been set in advance (same Figure). Here, as described above, the structural elements utilized are of a size larger than the long and thin artifacts L and smaller than diseased portion K, and are set in advance based on the accumulated clinical data. For a case in which the size of subtraction image Psu is 1760×1760 pixels(5 lines/mm), it is preferable that the round structural elements, for example, be of a diameter of 5-10 pixels. Of course, the structural elements can be changed in accordance with the size and shape of the diseased portion in the extracted image or the size and shape of the artifacts to be eliminated therefrom.

Figure 8C:
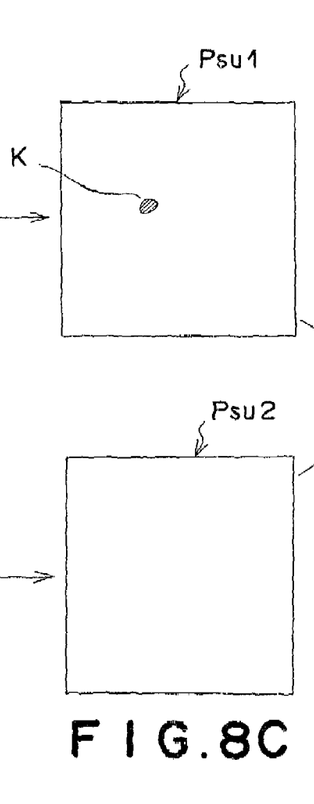
Figure 8D:
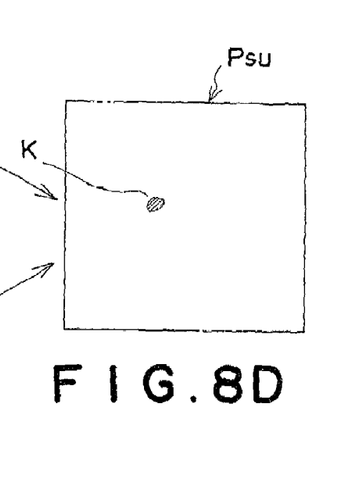

In the opening process morphology, because high density portions within the size range smaller than the structural elements are eliminated, almost all artifacts L1 (artifacts L that appear in the high-density range are designated as artifacts L1) larger than diseased portion K are eliminated. Likewise, in the closing process morphology, because low-density portions within the size range smaller than the structural elements are eliminated, almost all artifacts L2 (artifacts L that appear in the low-density range are designated as artifacts L2) larger than diseased portion K are eliminated (FIG. 8C).

The pixels of subtraction images Psu1 and Psu2 obtained in this way are again registered and the addition processing performed at a weighted ratio of 0.50×0.50 for both images, and subtraction image Psu is again recomposed.

Because subtraction image Psu recomposed and obtained in this way is an image in which artifacts L caused by misalignment of structural positions in images P1 and P2 have been controlled relative to diseased portion K of both images P1 and P2 (eliminated), obstruction of examination of diseased portion K due to artifacts has been reduced, with respect to the prior art.

Subtraction image Psu, which provides for excellent examination performance, is input to image display apparatus 20, and displayed as a visible image thereon. Because the artifacts contained in the visible image of subtraction image Psu displayed on image display apparatus 20 have been controlled, there are no obstructions to the examination of diseased portion K, and examination efficiency thereof is improved, with respect to the prior art.

According to the image processing apparatus of the current embodiment described above, by performing image processing, on an interimage-processed image, that enhances the substantial difference of the two images relative to the artifacts, artifacts, which can have an adverse effect on the image examination, can be reduced relative to the substantial difference between two images, which is the portion of interest to an examiner of the image, and examination of the substantial difference between two images can be performed more efficiently and effectively relative to the prior art.

In the current embodiment, an opening process morphology processing was performed on high-density subtraction image Psu1, however, the same results obtained by application of the opening process morphology can be obtained by application of a minimum filter in place thereof. Likewise, a closing process morphology processing was performed on low-density subtraction image Psu2, however, the same results obtained by application of the closing process morphology can be obtained by application of a maximum filter in place thereof.

In addition, because there are narrow ranges in which the density in a high and low contrast image changes drastically, artifacts having such sheer are searched by a Laplacian filter, and by subjecting to a smoothing processing the artifact obtained by the search therefor, the artifacts can be controlled relative to the substantial difference of the diseased portion, etc. Likewise, because artifacts contain many more frequency components in the high frequency range than does the substantial difference of the diseased portion, etc., the detected high frequency components can be made to be un-sharp. Making the high frequency components un-sharp can comprise performance of a Fourier transformation and excluding the high frequency range, and then performing a reverse Fourier transformation, or an processing utilizing an un-sharpness mask can be employed to smooth out the edges. Note that for the radiation image that was the subject of the image processing applied by the image processing apparatus of the embodiment described above, the artifacts occurred mainly due to the ribs, which extended in the horizontal direction, and a even if un-sharpness processing is performed only in the vertical direction, the effect of the present invention can be adequately obtained.

In addition, instead of processing that controls the artifacts, processing that emphasizes the substantial difference of the diseased portion, etc. can be performed. For example, the low frequency components that represent the tumor, etc. that is the diseased portion can be emphasized. Of course, it is also possible to perform processing to control the artifacts as well as processing to emphasize the substantial difference of the diseased portion, etc.

Figure 5:
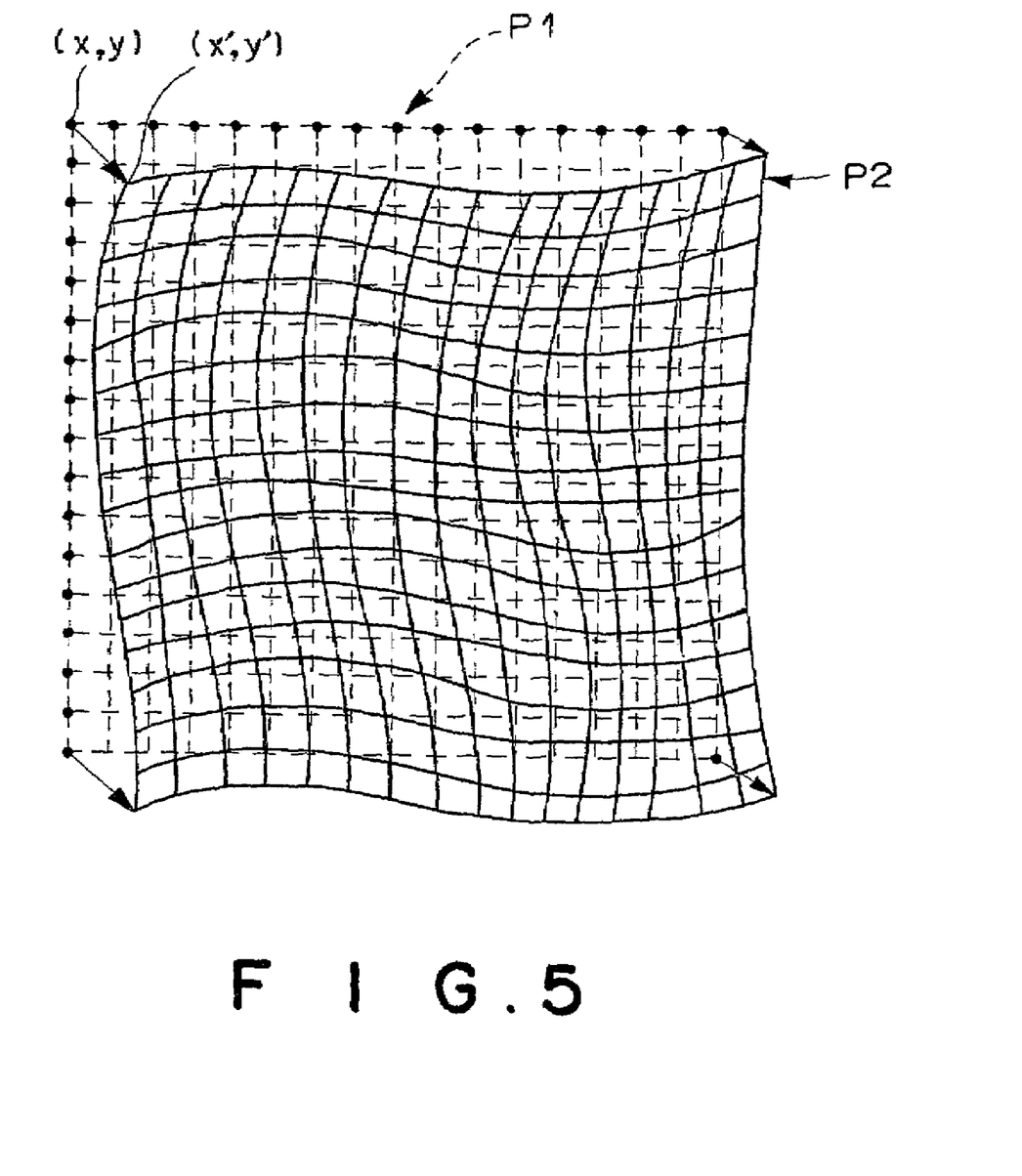
FIG. 5 is a figure provided for explanation of non-linear warping transformation.
Figure 6A:
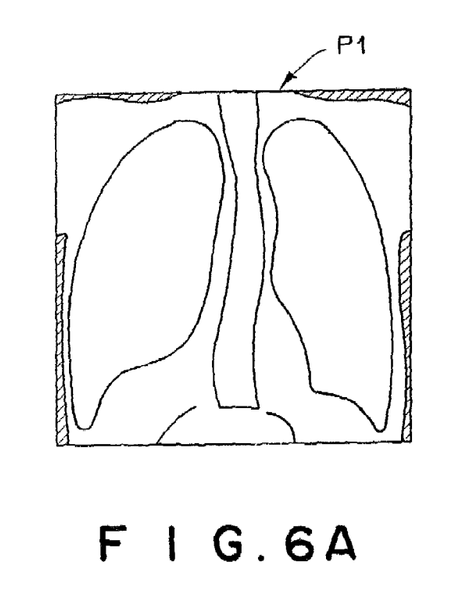
FIGS. 6A, 6B and 6C show a case in which the first image, and the second image, have been completely matched, and a subtraction image.
Figure 6B:
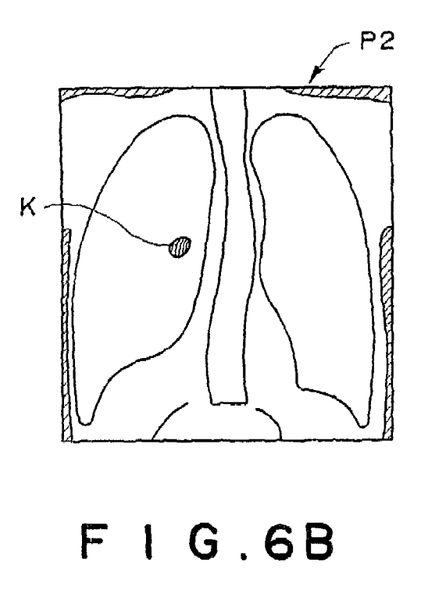
Figure 6C:
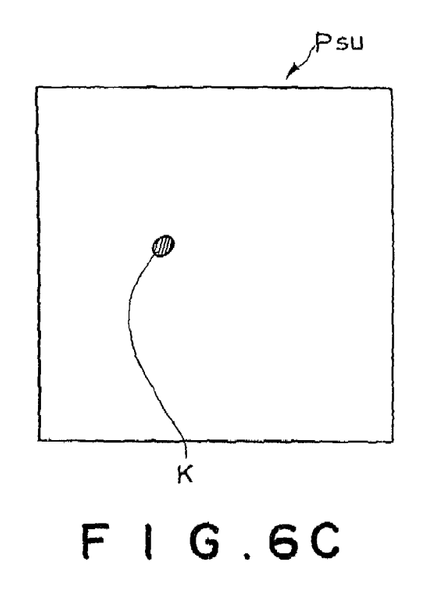
Figure 7:
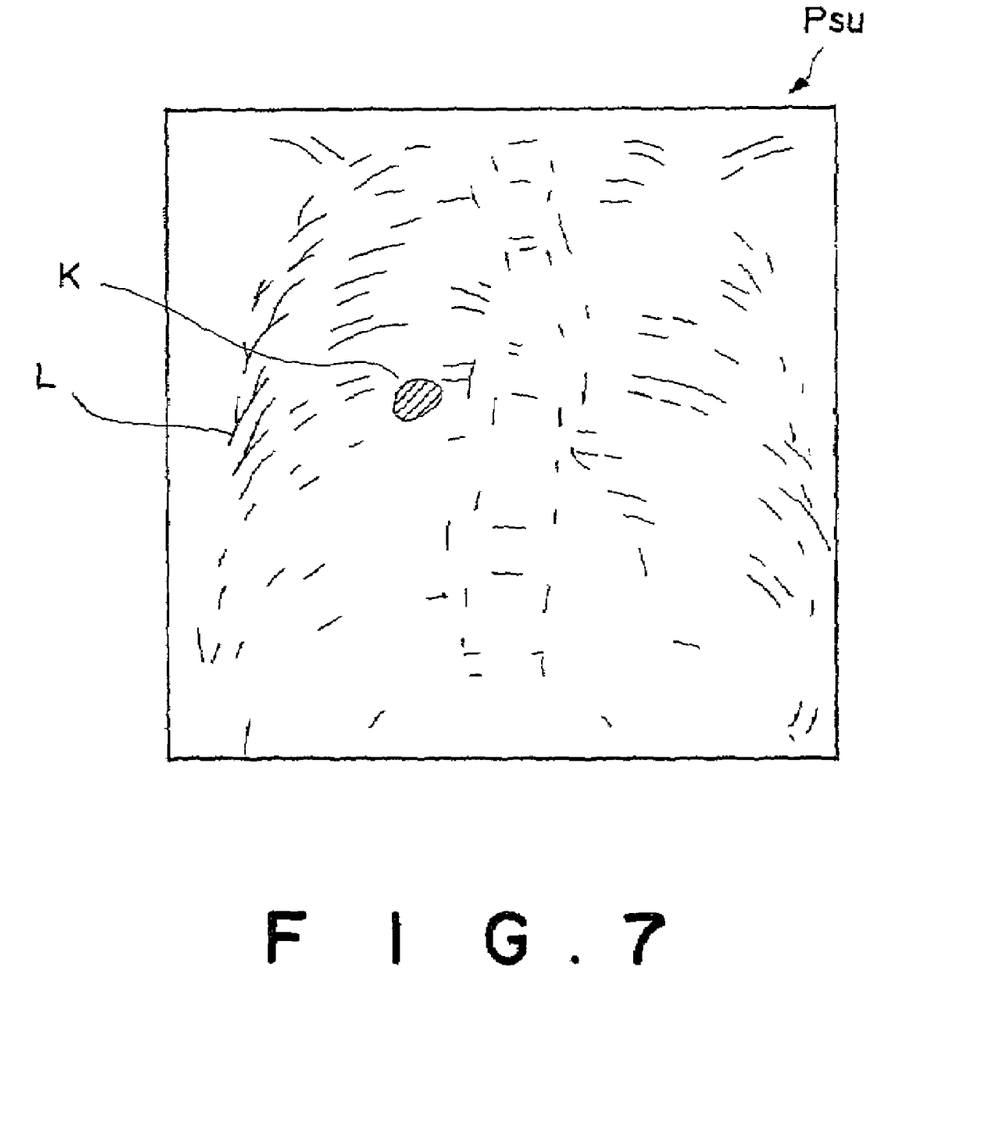
FIG. 7 shows an example of an substantial subtraction image.

Note that in the embodiment described above, by performance by interimage processing apparatus 30 of the non-linear transformation (warping) to match the positions of the local regions, the first image, P1, as shown in FIG. 5, does not maintain its original image shape (rectangular). Accordingly, the first image, P1, after being subjected to warping does not does not have the exact rectangular outline as shown in FIG. 6A, but has a curved, non-linear outline. On the other hand, because the second image, P2 has been subjected to no transformation processing whatsoever, it has a straight-line outline. Therefore, when pixels of the two images are to be registered and subtraction processing performed, there are cases for which there is no corresponding pixel in the first image, P1 that has been subjected to warping for a pixel in the second image, P2, and subtraction processing cannot be performed for the missing pixel.

In such a case, when there is no corresponding pixel in the image subjected to transformation processing (image P1 in the embodiment described above) for a pixel in the image not subjected to transformation processing, which serves as the base image, a new pixel can be set for the missing pixel, and the pixel value of that pixel can be given the same value as the corresponding pixel in the corresponding image (the second image,).

In addition, aside from supplementing the pixels in this way, the pixel in the base image can be deleted, the same as the pixel in the image that has been subjected to transformation processing. Because there are extremely few instances in which the portion of the image having no corresponding pixel falls within the region of the containing the area of interest to an examiner of the image, it has conventionally thought to be unnecessary. Carrying this idea one step further, by performance of an extraction processing that extracts only the image portions of the regions of interest contained within each of the images, which are the image subjected to warping (the first image,) and the base image (the second image,), the portion of the images to be subjected to subtraction processing can be limited in advance. This is also desirable in that the amount of computation is reduced. In the embodiment described above, because a chest radiation image has been the subject of processing, and in both the image that has been subjected to warping (the first image,) and the base image (the second image,) the area of interest is the chest, it is preferable that said two images be subjected to chest recognition processing, in which all the pixels of portions of the image other than that representing the chest are assigned a fixed pixel value. Note that the techniques and technology disclosed in Japanese Unexamined Patent Publication No. 8(1996)-335271 may be applied as such chest recognition processing.

What is claimed is:

1. An image processing method for carrying out image processing on an interimage-difference image obtained subjecting two desired images from among two or more images taken of the same subject to interimage processing and which represents a substantial difference between said two images, wherein said image processing carried out on said interimage-difference image is image processing by which the substantial difference between said two images represented therein is enhanced relative to artifacts arising due to misalignment of structural positions contained within said two images.

2. An image processing method as defined in claim 1, wherein said image processing comprises suppressing said artifacts relative to the substantial difference between said two images.

3. An image processing method as defined in claim 2, wherein suppression of said artifacts relative to the substantial difference between said two images comprises performance of image processing based on a morphology process utilizing structural elements larger than said artifacts and smaller than said substantial difference.

4. An image processing method as defined in claim 1, wherein said image processing comprises emphasizing the substantial difference between said two images relative to the artifacts.

5. An image processing method as defined in claim 1, 2, or 4, wherein said interimage processing comprises subtraction of corresponding structural positions within said two images.

6. An image processing method as defined in claim 3 wherein said interimage processing comprises subtraction of corresponding structural positions within said two images.

7. An image processing method as defined in claim 1, 2, or 4, wherein said two images are radiation images taken of the same subject at different points in time in a time series manner.

8. An image processing method as defined in claim 3, wherein said two images are radiation images taken of the same subject at different points in time in a time series manner.

9. An image processing method as defined in claim 5, wherein said two images are radiation images taken of the same subject at different points in time in a time series manner.

10. An image processing apparatus including a morphological processing device for providing a morphology process, and an image processing means for performing image processing procedures on an interimage-difference image obtained by subjecting two desired images from among two or more images taken of the same subject to interimage processing and which represents a substantial difference between said two images, wherein said image processing means carries out image processing on said interimage-difference image, said interimage difference image subject to the morphology process in the morphological processing device, by which the substantial difference between said two images represented therein is enhanced relative to artifacts arising due to misalignment of structural positions contained within said two images.

11. An image processing apparatus as defined in claim 10, wherein said image processing procedure comprises suppressing said artifacts relative to the substantial difference between said two images.

12. An image processing apparatus as defined in claim 11, wherein said image processing procedure comprises suppressing said artifacts relative to the substantial difference between said two images by applying image processing based on the morphology process utilizing structural elements larger than said artifacts and smaller than said substantial difference.

13. An image processing apparatus as defined in claim 10, wherein said image processing procedure comprises emphasizing the substantial difference between said two images relative to the artifacts.

14. An image processing apparatus as defined in claim 10, 11, 12, or 13 wherein said interimage processing procedure comprises subtraction of corresponding structural positions within said two images.

15. An image processing apparatus as defined in claim 10, 11, 12, or 13, wherein said two images are radiation images taken of the same subject at different points in time in a time series manner.

16. An image processing apparatus as defined in claim 14, wherein said two images are radiation images taken of the same subject at different points in time in a time series manner.

17. The image processing method of claim 1, wherein suppression of said artifacts comprises determining high frequency components of the interimage difference image, and subjecting the high frequency components to unsharp masking.

18. The image processing method of claim 1, wherein suppression of said artifacts comprises morphological processing based on comparison of width and length of forms, wherein the artifacts comprise elongated narrow forms in comparison to wider forms of the substantial difference.

19. The image processing of claim 1, wherein at least one of the images of the same subject is subject to warping before being subject to the image processing.

* * * * *